(12) United States Patent
Ono (10) Patent No.: US 11,214,165 B2
(45) Date of Patent: Jan. 4, 2022

(54) VEHICLE CHARGE CONTROLLER FOR PREVENTING EXTERNAL CHARGING FROM CHARGING FACILITY BASED ON RESPONSE TIME OF CHARGING FACILITY

(71) Applicant: Toyota Jidosha Kabushiki Kaisha, Toyota (JP)

(72) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/712,121

(22) Filed: Dec. 12, 2019

(65) Prior Publication Data

US 2020/0189415 A1    Jun. 18, 2020

(30) Foreign Application Priority Data

Dec. 13, 2018   (JP) ............................. JP2018-233168

(51) Int. Cl.
*B60L 53/62* (2019.01)
*H02J 7/00* (2006.01)
*B60L 53/66* (2019.01)
*B60L 53/16* (2019.01)

(52) U.S. Cl.
CPC .............. *B60L 53/62* (2019.02); *B60L 53/16* (2019.02); *B60L 53/66* (2019.02); *H02J 7/0047* (2013.01)

(58) Field of Classification Search
CPC .......... B60L 53/16; B60L 53/62; B60L 53/66; H02J 7/0047
See application file for complete search history.

(56) References Cited

U.S. PATENT DOCUMENTS

2011/0279082 A1* 11/2011 Hagenmaier, Jr. ...... B60L 53/62
320/109
2014/0197790 A1* 7/2014 Kaneyasu ............... B60L 53/65
320/109

FOREIGN PATENT DOCUMENTS

JP    2013-048518 A    3/2013
JP    2016-171613 A    9/2016

* cited by examiner

*Primary Examiner* — David V Henze-Gongola
(74) *Attorney, Agent, or Firm* — Dinsmore & Shohl LLP (57) ABSTRACT

An ECU executes a charge preparation communication sequence after a connector is connected to an inlet and before external charging is performed, and counts a response time (message transmission and reception time) of a charging station to a prescribed event. A memory stores a message transmission and reception time of a specific charging station. The ECU does not perform external charging when the message transmission and reception time counted during the charge preparation communication sequence is equal to the message transmission and reception time stored in the memory.

6 Claims, 6 Drawing Sheets

VEHICLE CHARGE CONTROLLER FOR PREVENTING EXTERNAL CHARGING FROM CHARGING FACILITY BASED ON RESPONSE TIME OF CHARGING FACILITY

CROSS REFERENCE TO RELATED APPLICATIONS

This nonprovisional application claims priority to Japanese Patent Application No. 2018-233168 filed on Dec. 13, 2018, with the Japan Patent Office, the entire contents of which are hereby incorporated by reference.

BACKGROUND

Field

The present disclosure relates to a charge controller and a vehicle including the same, and more particularly, to a charge controller for a vehicle which is configured to perform external charging of charging a power storage device mounted on the vehicle by a charging facility provided outside the vehicle and a vehicle including the same.

Description of the Background Art

Japanese Patent Laying-Open No. 2013-48518 discloses a vehicle charging device capable of external charging. If an abnormality occurs in external charging, the vehicle charging device is switched to charging control based on a control signal transmitted and received to and from a charging facility outside the vehicle via a control signal contact portion.

For a specific charging facility that continues power transmission to the vehicle though the vehicle has notified the charging facility outside the vehicle of a charge stop command because of any abnormality that has occurred during external charging (during application of power), a relay (charge relay) provided on a charging path may be forcibly opened during application of power in the vehicle. However, if the charge relay is forcibly opened during external charging, the relay may be fused due to arc discharge, or the relay may fail or deteriorate due to heat generation. Also, the user who has recognized that external charging has stopped may insert and extract the charging connector to restart external charging. In such a case, a risk of failure of the relay increases further by forcibly opening the relay. Japanese Patent Laying-Open No. 2013-48518 does not particularly describe a study to address such a problem.

SUMMARY

The present disclosure has been made to solve such a problem, and an object of the present disclosure is to provide a charge controller capable of preventing external charging from a specific charging facility as described above to reduce a risk of failure of a charge relay, and also provide a vehicle including the charge controller.

A charge controller of the present disclosure is a charge controller for a vehicle which is configured to perform external charging of charging a power storage device mounted on the vehicle by a charging facility provided outside the vehicle, and includes a control device (electronic control unit, or, ECU) and a power storage device. The vehicle includes a power receiving inlet (inlet) that receives power from the charging facility, and a relay (charge relay) provided on an electric path between the power receiving inlet and the power storage device. The control device is configured to forcibly open the relay when power transmission from the charging facility is continued even though an abnormality has occurred during the external charging. The control device is further configured to execute a prescribed charge preparation communication sequence while communicating with the charging facility after the charging facility is connected to the power receiving inlet and before the external charging is performed, and count a response time (message transmission and reception time) of the charging facility to a prescribed event during the charge preparation communication sequence. The storage device is configured to store the response time (message transmission and reception time) of a charging facility that continues power transmission even though an abnormality has occurred during the external charging. The control device is configured not to perform external charging when the response time counted during the charge preparation communication sequence is equivalent to the response time stored in the storage device.

The response time (message transmission and reception time) of the charging facility to a prescribed event indicates a value unique to a charging facility manufacturer. In the charge controller, a response time (message transmission and reception time) of a specific charging facility that continues power transmission though an abnormality has occurred during external charging is stored in the storage device. When the response time counted during the charge preparation communication sequence is equal to the response time stored in the storage device, external charging is not performed. This can prevent a situation in which the specific charging facility repeatedly performs external charging and the relay is repeatedly forcibly opened, thereby reducing a risk of failure (e.g., fusing) of the relay.

When power transmission from the charging facility is continued though an abnormality has occurred during the external charging, the control device may forcibly open the relay and control the storage device to store the response time (message transmission and reception time) counted during the charge preparation communication sequence of the external charging.

Alternatively, when a stop of power transmission from the charging facility is not acknowledged even though the control device has requested the charging facility to stop power transmission during the external charging, the control device may forcibly open the relay and control the storage device to store the response time (message transmission and reception time) counted during the charge preparation communication sequence of the external charging.

The charge controller counts a response time (message transmission and reception time) of a specific charging facility that continues power transmission though an abnormality has occurred during the external charging, and stores the response time in the storage device. Alternatively, the charge controller counts a response time of a specific charging facility, a stop of power transmission from which cannot be acknowledged though the charge controller has requested the charging facility to stop power transmission during the external charging, and stores the response time in the storage device. Consequently, the manufacturer of the specific charging facility can be specified based on an actual facility to avoid external charging by the charging facility of the relevant manufacturer.

The response time (message transmission and reception time) stored in the storage device may be a response time set in advance.

The charge controller stores a response time (message transmission and reception time) of a specific charging facility in the storage device in advance when this response time is specified in advance, and accordingly, can specify the manufacturer of the specific charging facility in advance and avoid external charging by the charging facility of the relevant manufacturer.

The charge controller may further include a notification device. The notification device may be configured to issue an alarm to urge use of another charging facility when the response time (message transmission and reception time) counted during the charge preparation communication sequence is equivalent to the response time stored in the storage device.

Consequently, the user can recognize that external charging cannot be performed by the connected charging facility and move the vehicle to another charging facility for external charging.

A vehicle of the present disclosure includes the charge controller described above.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments of the present disclosure will be described with reference to the accompanying drawings. Note that the same reference signs are used to refer to the same or like parts, and the description thereof will not be repeated.

Figure 1:
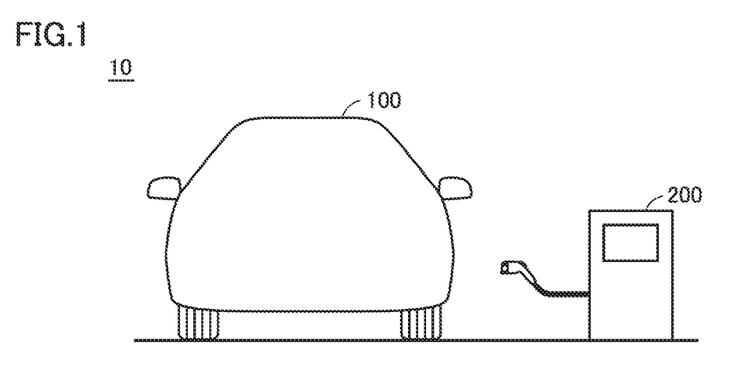
FIG. 1 schematically shows a general configuration of a charging system in which a charge controller according to an embodiment of the present disclosure is used.

FIG. 1 schematically shows a general configuration of a charging system in which a charge controller according to an embodiment of the present disclosure is used. Referring to FIG. 1, a charging system 10 includes a vehicle 100 and a charging station 200.

Vehicle 100 is an electric vehicle which is equipped with a power storage device and is capable of traveling by a motor using power stored in the power storage device, as described below with reference to FIG. 2. Vehicle 100 may be, for example, a hybrid vehicle which is additionally equipped with an engine besides the motor, or may be a fuel cell vehicle which is additionally equipped with a fuel cell besides the power storage device.

Vehicle 100 is configured to charge the power storage device using power supplied from charging station 200. A connector, which is provided at the tip of a charging cable extending from charging station 200, is connected to an inlet of vehicle 100. As an instruction to perform external charging is provided in vehicle 100 or charging station 200, charging station 200 charges the power storage device of vehicle 100 through the charging cable.

Figure 2:
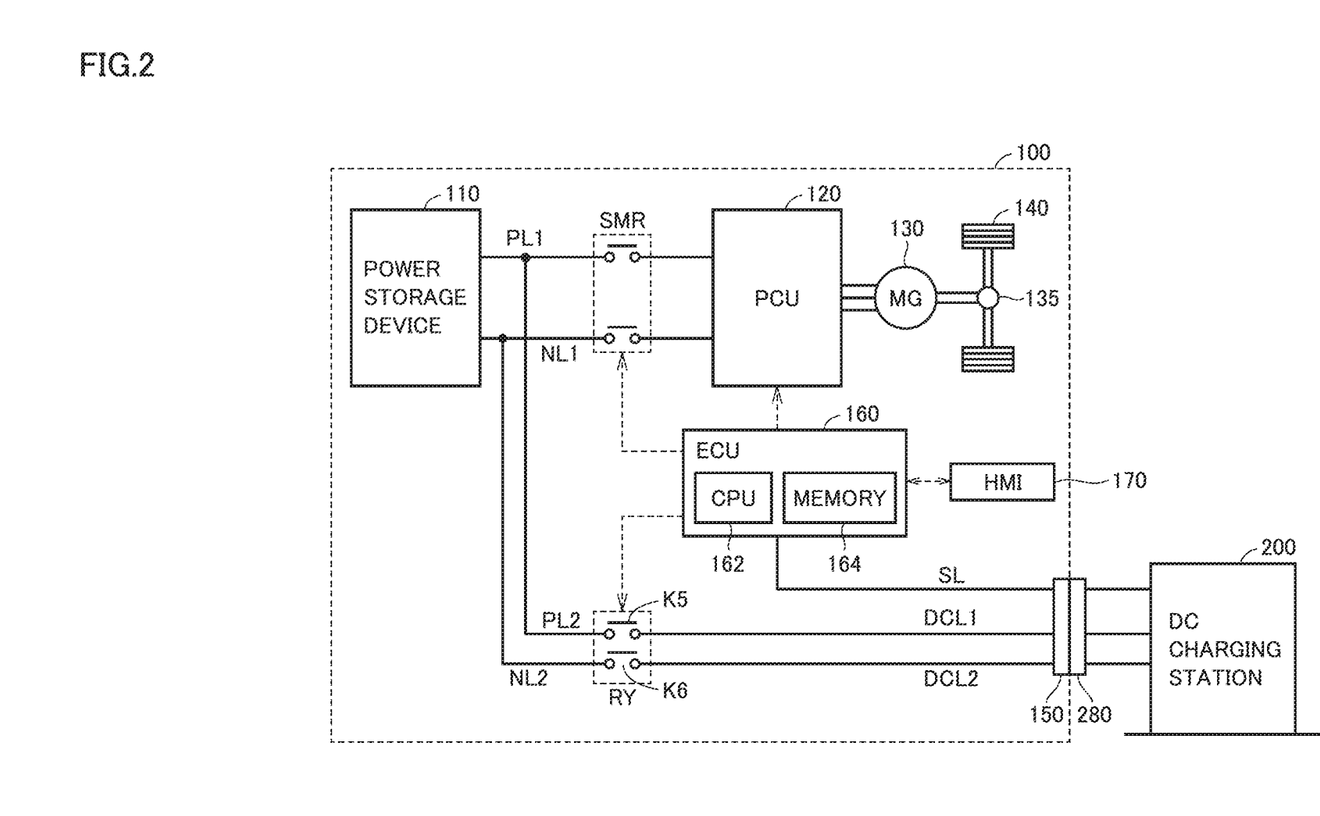
FIG. 2 shows an example configuration of a vehicle.

FIG. 2 shows an example configuration of vehicle 100. Referring to FIG. 2, vehicle 100 includes a power storage device 110, a system main relay SMR, a power control unit (hereinafter referred to as "PCU") 120, a motor generator (hereinafter referred to as "MG") 130, a power transmission gear 135, driving wheels 140, an inlet 150, and a charge relay RY. Vehicle 100 further includes an ECU 160 and a human machine interface (HMI) device 170.

Power storage device 110 is a chargeable and dischargeable power storage element. Power storage device 110 includes, for example, a secondary battery such as a lithium-ion battery or a nickel-metal hydride battery, or a power storage element such as an electric double layer capacitor. The lithium-ion secondary battery is a secondary battery which contains lithium as a charge carrier, and can include a general lithium-ion secondary battery including a liquid electrolyte, as well as an all-solid-state battery including a solid electrolyte.

Power storage device 110 is charged by charging station 200 connected to inlet 150 through the charging cable (external charging). Power storage device 110 supplies stored power to MG 130 through PCU 120 during traveling of the vehicle. Power storage device 110 is also charged by receiving power, which is generated by MG 130, through PCU 120 in regenerative power generation of MG 130 during braking of the vehicle.

System main relay SMR is provided between PCU 120 and power lines PL1 and NL1 connected to power storage device 110, and is turned on by ECU 160 when a vehicle system is activated by a start switch (not shown) or the like.

PCU 120 is a drive device that drives MG 130 and includes a power conversion device such as a converter or an inverter. PCU 120 is controlled by ECU 160 and converts direct-current (DC) power received from power storage device 110 into alternating-current (AC) power for driving MG 130. PCU 120 converts the AC power generated by MG 130 into DC power and outputs the DC power to power storage device 110.

MG 130 is typically an AC rotating electric machine, for example, a three-phase AC synchronous motor with a rotor having a permanent magnet embedded therein. MG 130 is driven by PCU 120 to generate a rotational driving force, and the driving force generated by MG 130 is transmitted to driving wheels 140 through power transmission gear 135. Contrastingly, for example, during braking of the vehicle, MG 130 operates as a generator for regenerative power generation. Power generated by MG 130 is supplied to power storage device 110 through PCU 120.

Charge relay RY is provided in an electric path between inlet 150 and power storage device 110. Specifically, charge relay RY includes relays K5 and K6. Relay K5 is provided between power line DCL1 connected to inlet 150 and power line PL2 connected to the positive electrode of power storage device 110. Relay K6 is provided between power line DCL2 connected to inlet 150 and power line L2 connected to the negative electrode of power storage device 110. Charge relay RY is turned on/off by ECU 160.

Inlet 150 receives charging power supplied from charging station. 200 during external charging. Inlet 150 is connected with a connector 280 provided at the tip of the charging cable connected to charging station 200. During external charging, DC power output from charging station 200 is supplied to power storage device 110 through inlet 150, power lines DCL1 and DCL2, charge relay RY, power lines PL2 and NL2, and power lines PL1 and NL1.

ECU 160 includes a central processing unit (CPU) 162, a memory (random access memory (RAM) and a readable/writable read only memory (ROM)) 164, and an I/O port (not shown) for inputting and outputting of various signals. CPU 162 deploys a program stored in the ROM to the RAM and executes the program. Processing of ECU 160 is described in the program stored in the ROM. When connector 280 is connected to inlet 150, ECU 160 exchanges various messages with charging station 200 through a signal line SL for external charging.

The present embodiment describes an example in which direct current (DC) charging is performed in accordance with standard GB/T 18487 (conductive charging system of an electric vehicle), and communications between vehicle 100 and charging station 200 are performed in accordance with a communication protocol (e.g., standard GB/T 27930) adopted in GB/T 18487.

The charging system adoptable by the charge controller of the present disclosure is not limited to the system according to GB/T 18487. For example, CHAdeMO (registered trademark) system or a combined charging system (Combo) system, which is being standardized under the initiative of Europe and the United States, is also adoptable. The communications between vehicle 100 and charging station 200 are also not limited to the communications according to the communication protocol of GB/T 27930, and may be performed through controller area network (CAN) communication adopted in the CHAdeMO system or power line communication (PLC) adopted in the Combo system.

During traveling of the vehicle, ECU 160 turns on system main relay SMR and also controls PCU 120, thereby controlling driving of MG 130 and charging and discharging of power storage device 110. During external charging, ECU 160 turns on charge relay RY and also exchanges various messages with charging station 200 through signal line SL for external charging. Further, when the state of charge (SOC) of power storage device 110 reaches an upper limit, ECU 160 transmits a charging stop request to charging station 200 through signal line SL and also turns off charge relay RY.

Charging station 200 is a charging facility for supplying power to vehicle 100. Charging station 200 is, for example, a quick charging station which is installed in a public facility and is capable of supplying DC power of several tens of kW to several hundreds of kW. The charging cable of charging station 200 is provided with connector 280. Connecting connector 280 to inlet 150 of vehicle 100 allows vehicle 100 and charging station 200 to be electrically connected to each other through the charging cable and also communicate with each other.

HMI device 170 is a device that provides various information to the user of vehicle 100 and accepts the operation of the user of vehicle 100. HMI device 170 includes a display with a touch panel, a speaker, and the like.

Figure 3:
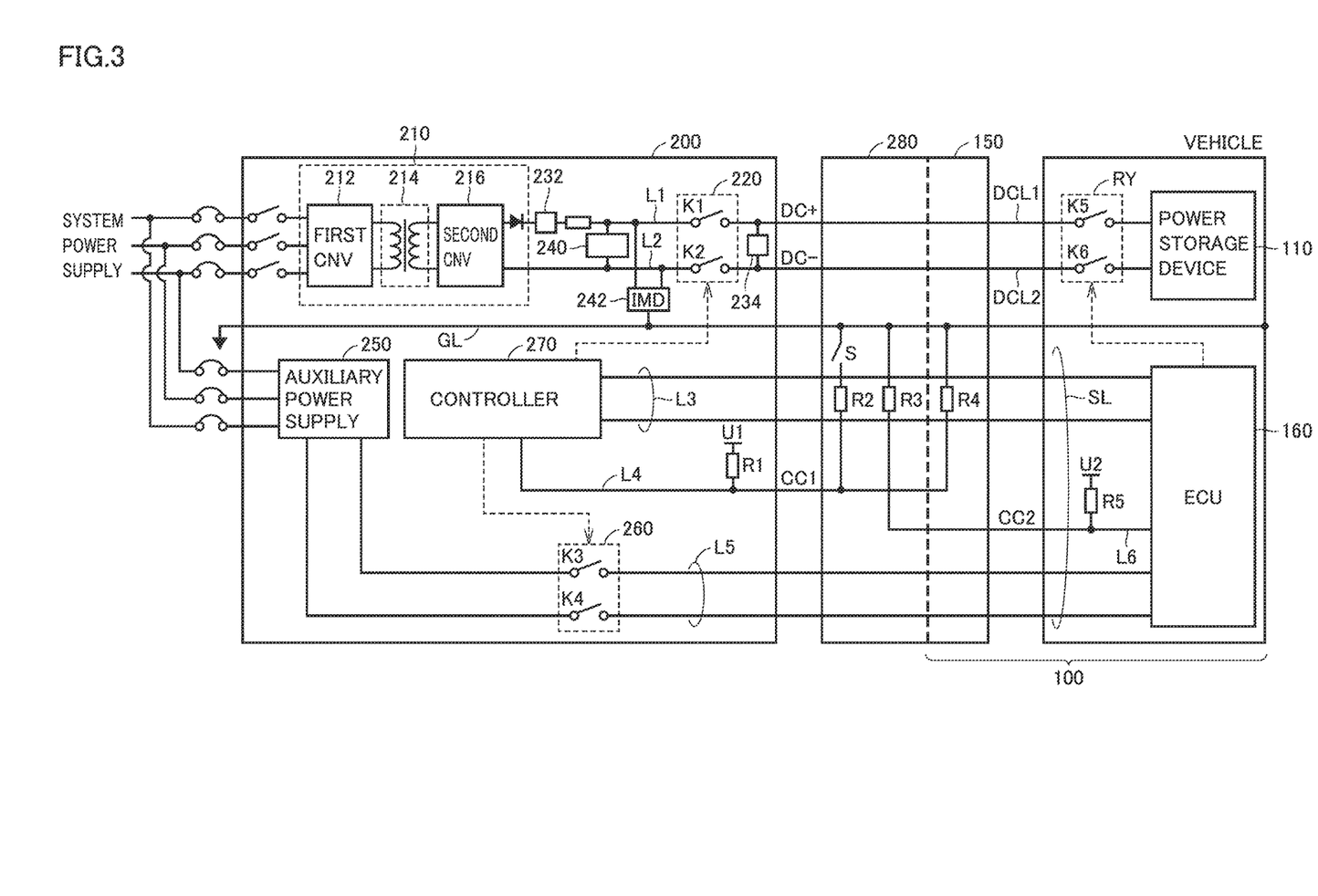
FIG. 3 shows an electrical configuration of the charging system in detail.

FIG. 3 shows an electrical configuration of the charging system in detail. Referring to FIG. 3, charging station 200 includes a power converter 210, a relay circuit 220, a current sensor 232, a voltage sensor 234, a bleeder circuit 240, and an insulation monitoring device (IMD) 242.

Power converter 210 includes a first conversion unit 212, an isolation transformer 214, and a second conversion unit 216. First conversion unit 212 converts three-phase AC power supplied from a system power supply into single-phase AC power and outputs the single-phase AC power to isolation transformer 214. First conversion unit 212 is composed of, for example, an AC/DC converter (rectifier circuit) and an inverter.

Isolation transformer 214 converts the AC power from first conversion unit 212 into a voltage corresponding to a winding ratio between a primary coil and a secondary coil and outputs it to second conversion unit 216. Second conversion unit 216 converts the AC power received from isolation transformer 214 into DC power and outputs the DC power to power lines L1 and L2. Second conversion unit 216 is, for example, an AC/DC converter (rectifier circuit).

Relay circuit 220 is provided in power lines L1 and L2. Specifically, relay circuit 220 includes relays K1 and K2, and relays K1 and K2 are provided in power lines L1 and L2, respectively. Relay circuit 220 is turned on/off by a controller 270 (described below).

Current sensor 232 detects a current flowing through power line L1 and outputs a value of the detection to controller 270. Current sensor 232 may detect a current flowing through power line L2. Voltage sensor 234 detects a voltage between power lines L1 and L2 on the side close to connector 280 relative to relay circuit 220 and outputs a value of the detection to controller 270.

Bleeder circuit 240 is connected between power lines L1 and L2 on the side close to power converter 210 relative to relay circuit 220 and is configured to discharge a voltage remaining in power converter 210 (second conversion unit 216). Bleeder circuit 240 is controlled to be closed/opened by controller 270. IMD 242 is connected between power lines L1 and L2 and a ground line GL and determines a state of insulation between charging paths (L1, L2) and the ground.

Charging station 200 further includes an auxiliary power supply 250, a relay circuit 260, and controller 270. Auxiliary power supply 250 receives a supply of power from the system power supply to generate a low DC voltage (e.g., DC 12 V) and outputs the generated DC voltage to a power line L5. Relay circuit 260 is provided in power line L5. Specifically, relay circuit 260 includes relays K3 and K4 and is turned on/off by controller 270.

Controller 270 includes a CPU, a memory (RAM and ROM), and an I/O port for inputting/outputting various signals (all of which are not shown). The CPU deploys a program stored in the ROM to the RAM and executes the program. Processing of controller 270 is described in the program stored in the ROM.

Controller 270 controls relay circuits 220 and 260 to be turned on/off and controls the operations of various devices such as power converter 210, bleeder circuit 240, and IMD 242. When connector 280 is connected to inlet 150 of vehicle 100, controller 270 exchanges various messages with ECU 160 of vehicle 100 through signal line L3 and performs external charging. The control performed by controller 270 will be described below in detail.

Connector 280 is provided with a switch S and resistive elements R2 and R3. Inlet 150 of vehicle 100 is provided with a resistive element R4. Switch S and resistive element R2 are connected in series between ground line GL and line L4. Resistive element R4 is connected between ground line GL and line L4 in parallel with switch S and resistive element R2. A voltage is applied to line L4 from a power supply node U1 having a certain potential through resistive element R1, and controller 270 can detect a potential CC1 of line L4.

Controller 270 detects a state of connection between connector 280 and inlet 150 by detecting potential CC1 of line L4. That is to say, a resistance value of resistive element R1 is set such that potential CC1 attains to U1a (e.g., 12 V) when connector 280 is not connected to inlet 150. A resistance value of resistive element R4 is set such that potential CC1 attains to U1c (e.g., 6V) when connector 280 is connected to inlet 150 and switch S is turned off. A resistance value of resistive element R2 is set such that potential CC1 attains to U1c (e.g., 4 V) when connector 280 is connected to inlet 150 and switch S is turned on. Switch S is configured to be turned on when connector 280 is fully connected to inlet 150. With such a configuration, controller 270 can detect potential CC1 of line L4 to detect the state of connection between connector 280 and inlet 150.

Resistive element R3 is connected between ground line GL and a line L6. A voltage is applied to line L6 from a power supply node U2 having a certain potential through a resistive element R5 in vehicle 100, and ECU 160 of vehicle 100 can detect a potential CC2 of line L6.

In vehicle 100, ECU 160 detects the state of connection between connector 280 and inlet 150 by detecting potential CC2 of line L6. That is to say, a resistance value of resistive element R5 is set such that potential CC2 attains to U2a (e.g., 12 V) when connector 280 is not connected to inlet 150. A resistance value of resistive element R3 is set such that potential CC2 attains to U2b (e.g., 6 V) when connector 280 is connected to inlet 150. With such a configuration, ECU 160 can detect potential CC2 of line L6 to detect the state of connection between connector 280 and inlet 150.

When connector 280 is connected to inlet 150 and relays K3 and K4 of relay circuit 260 are turned on in charging station 200, ECU 160 of vehicle 100 receives a voltage from power line L5. Upon receipt of the voltage from power line L5, ECU 160 can start processing of external charging. ECU 160 may operate on low-voltage power received from power line L5, or regard a voltage input from power line L5 as a condition on which processing of external charging is operated.

Figure 4:
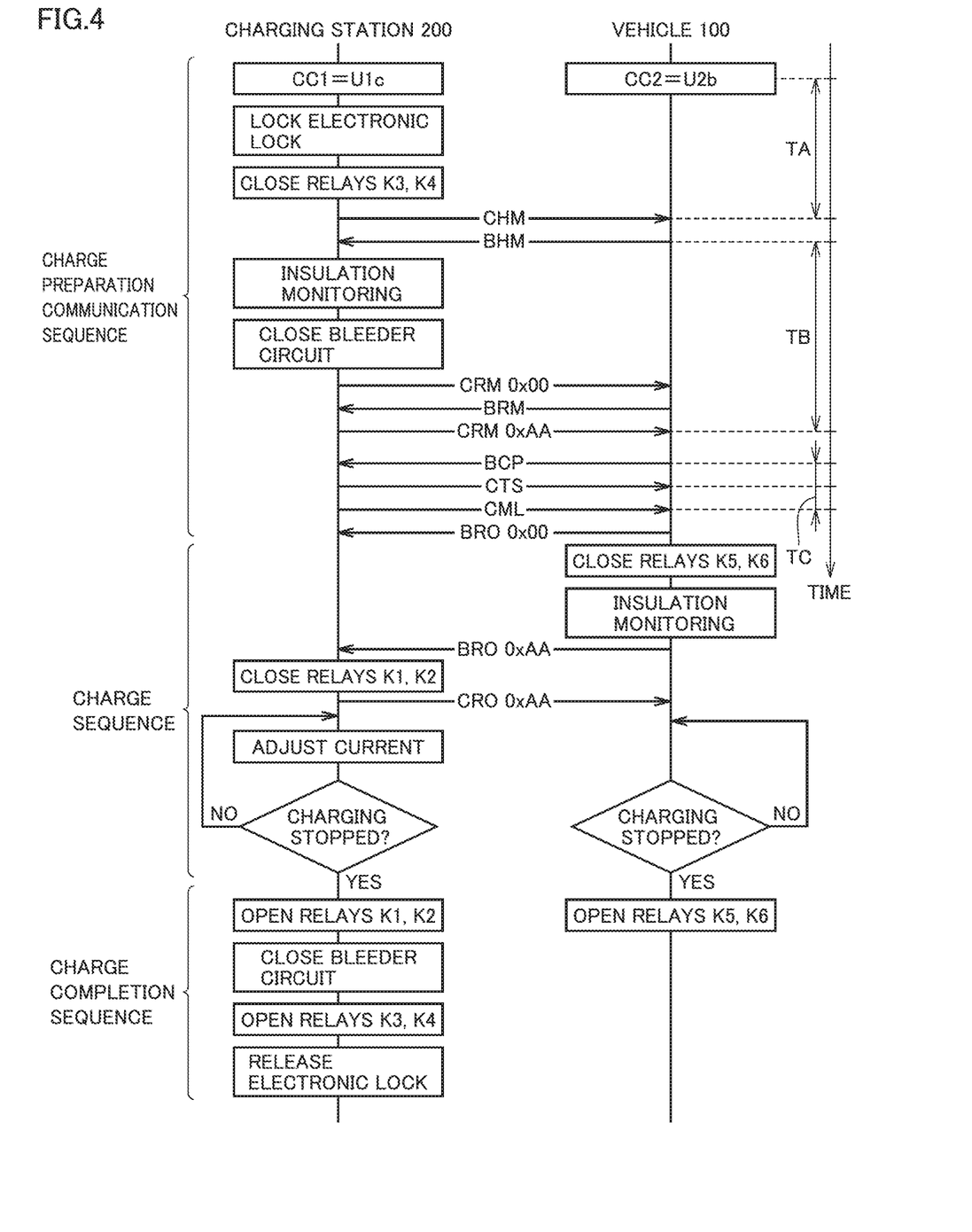
FIG. 4 is a sequence diagram showing an example flow of processing associated with external charging.

FIG. 4 is a sequence diagram showing an example flow of processing associated with external charging. FIG. 4 shows an example flow of the processing in charging station 200 and vehicle 100 after the connection of connector 280 to inlet 150, and example information (message) exchanged between vehicle 100 and charging station 200.

Referring to FIG. 4, a series of sequences is roughly divided into three stages. That is to say, the series of sequences includes a charge preparation communication sequence, a charge sequence, and a charge completion sequence.

The charge preparation communication sequence is a sequence for preparation of external charging, which is performed prior to the charge sequence. The charge sequence is a sequence in actual power transmission from charging station 200 to vehicle 100. The charge completion sequence is a sequence performed after a stop of external charging. Each of the sequences will be described below.

<Charge Preparation Communication Sequence>

Referring to FIG. 4 as well as FIG. 3, when connector 280 is connected to inlet 150 and switch S is turned on, potential CC1 of line L4 attains to U1c (e.g., 4 V) in charging station 200, and potential CC2 of line L6 attains to U2b (e.g., 6 V) in vehicle 100.

In charging station 200, when potential CC1 attains to U1c, controller 270 locks an electronic lock (not shown) provided in the connecting portion between connector 280 and inlet 150. Controller 270 then closes relays K3 and K4 of relay circuit 260. When relays K3 and K4 are closed, controller 270 transmits a message CHM to vehicle 100. Message CHM is a message transmitted from charging station 200 to vehicle 100 in order to check a handshake between charging station 200 and vehicle 100.

In vehicle 100, when potential CC2 attains to U2b and ECU 160 receives message CHM from charging station 200, ECU 160 transmits a message BHM to charging station 200. Message BHM is a message transmitted from vehicle 100 to charging station 200 to check a handshake.

In charging station 200, upon receipt of message BHM from vehicle 100, controller 270 determines the state of insulation of charging station 200 using IMD 242 (insulation monitoring). When determining the insulation status (it is assumed here that the state of insulation is normal), controller 270 closes bleeder circuit 240 and, as a result of the determination of the state of isolation, causes bleeder circuit 240 to discharge the voltage stored in second conversion unit 216.

Upon completion of discharge by bleeder circuit 240, controller 270 transmits a message CRM to vehicle 100. Message CRM is an identification message transmitted from charging station 200 to vehicle 100 in order to acknowledge that the communication link between charging station 200 and vehicle 100 is accurate, and <0x00> is a value of a prescribed parameter included in message CRM and means that controller 270 has not identified vehicle 100.

In vehicle 100, upon receipt of message CRM <0x00> from charging station 200, ECU 160 transmits a message BRM to charging station 200. Message BRM includes the identification information on vehicle 100, for example, includes information on a version number of a communication protocol installed in vehicle 100, and a type, rated capacity, and rated voltage of power storage device 110.

In charging station 200, upon receipt of message BRM from vehicle 100, controller 270 transmits message CRM to vehicle 100 again. <0xAA> is a value of a parameter of message CRM described above and means that controller 270 has successfully identified vehicle 100.

In vehicle 100, upon receipt of message BRM<0xAA> from charging station 200, ECU 160 transmits a message BCP to charging station 200. Message BCP is a message regarding a charging parameter of power storage device 110 and includes, for example, information on a permissible charging voltage, a permissible charging current, a full charge capacity, a permissible temperature, and a current voltage of power storage device 110.

In charging station 200, upon receipt of message BCP from vehicle 100, controller 270 transmits a message CTS to vehicle 100. Message CTS is time information synchronized between charging station 200 and vehicle 100. Controller 270 further transmits a message CML to vehicle 100. Message CML includes information on the output capacity of charging station 200 and includes, for example, information on a maximum output voltage, a minimum output voltage, a maximum output current, and a minimum output current.

In vehicle 100, upon receipt of message CML from charging station 200, ECU 160 transmits a message BRO to vehicle 100. Message BRO is a message indicating whether the charge preparation has completed in vehicle 100. <0x00> is a value of a prescribed parameter included in message BRO and means that the charge preparation has not completed in vehicle 100.

<Charge Sequence>

In vehicle 100, when transmitting message BRO<0x00> to charging station 200, ECU 160 closes relays K5 and K6 of charge relay RY. When relays K5 and K6 are closed, ECU 160 determines the state of insulation of vehicle 100 (insulation monitoring) with an insulation determination device (not shown in FIGS. 2 and 3) provided in vehicle 100. When the state of insulation is determined (it is assumed here that the state of insulation is normal), ECU 160 transmits message BRO to charging station 200 again. <0xAA> is a value of a parameter of message BRO described above and means that the charge preparation has completed in vehicle 100.

In charging station 200, upon receipt of message BRO<00xAA> from vehicle 100, controller 270 closes relays K1 and K2 of relay circuit 220. When relays K1 and K2 are closed, controller 270 transmits a message CRO to vehicle 100. Message CRO is a message indicating whether the charge preparation has completed in charging station 200. <00xAA> is a value of a prescribed parameter included in message CRO and means that the charge preparation has completed in charging station 200.

Consequently, power transmission from charging station 200 to vehicle 100 is allowed. Thereafter, power converter 210 is driven for power transmission to vehicle 100 in charging station 200, and power storage device 110 is charged in vehicle 100.

A current (charging current) is adjusted by appropriately controlling power converter 210 in charging station 200. Controller 270 then determines whether external charging has stopped, and when determining that external charging has stopped, proceeds to the charge completion sequence. Also in vehicle 100, ECU 160 determines whether external charging has stopped, and when determining that external charging has stopped, proceeds to the charge completion sequence.

<Charge Completion Sequence>

In charging station 200, when determining that external charging has stopped, controller 270 opens relays K1 and K2 of relay circuit 220. Controller 270 then closes bleeder circuit 240 and causes bleeder circuit 240 to discharge the voltage stored in second conversion unit 216. Controller 270 then opens relays K3 and K4 of relay circuit 260. Controller 270 then releases the electronic lock of the connecting portion between connector 280 and inlet 150.

In vehicle 100, when determining that external charging has stopped, ECU 160 opens relays K5 and K6 of charge relay RY. Consequently, all of relays K1 to K6 are opened, and a series of processing regarding external charging is complete.

For a specific charging station 200 that continues power transmission to vehicle 100 though vehicle 100 has notified charging station 200 that charging has stopped due to, for example, an abnormality that has occurred during external charging (during application of power) according to the series of sequences described above, charge relay RY may often be forcibly opened during application of power in vehicle 100. In particular, in the case where DC charging by a DC charging station is performed as in the present embodiment, charge relay RY needs to be forcibly opened to stop charging because no power converter is arranged in the charging electrical path in vehicle 100.

However, when charge relay RY is forcibly opened during application of power, for example, the relay may be fused due to arc discharge, or the relay may fail or degrade due to heat generation. A user who has recognized that external charging has stopped may insert and extract connector 280 to restart external charging, and in this case, a risk that charge relay RY may fail increases further because charge relay RY has been forcibly opened again.

In the charge controller according to the present embodiment, thus, a response time (hereinafter referred to as "message transmission and reception time") of charging station 200 to a prescribed event is counted during the charge preparation communication sequence. This message transmission and reception time depends on a processing time of charging station 200 corresponding to the prescribed event and is unique to each maker of charging station 200. When charging station 200 continues power transmission though an abnormality or the like has occurred during external charging, charge relay RY is forcibly opened in vehicle 100, and also, the message transmission and reception time counted during the charge preparation communication sequence performed for the external charging is stored in the ROM (readable/writable) of memory 164. The message transmission and reception time stored herein is used to specify a manufacturer of specific charging station 200 that continues power transmission though an abnormality has occurred during external charging.

It is also conceivable that vehicle 100 may be notified of individual identification information (e.g., a name or an address of a manufacture) on charging station 200 through communications between vehicle 100 and charging station 200. However, not all charging station manufactures design charging station 200 such that the individual identification information on charging station 200 is output to vehicle 100. The charge controller according to the present embodiment thus specifies a manufacturer of specific charging station 200 not by notification of the identification information on charging station 200 from charging station 200 to vehicle 100, but by a message transmission and reception time counted during the charge preparation communication sequence.

The charge controller according to the present embodiment does not perform external charging when the message transmission and reception time counted during the charge preparation communication sequence is equal to the message transmission and reception time stored in memory 164. This can prevent a situation in which specific charging station 200 repeatedly performs external charging and charge relay RY is repeatedly forcibly opened, thus reducing a risk of failure (e.g., fusing) of charge relay RY.

The message transmission and reception time counted during the charge preparation communication sequence can be a period of time TA from a time at which potential CC2 attaints to potential U2b in vehicle 100 (i.e., a time at which potential CC1 attains to U1c in charging station 200) to a time at which vehicle 100 receives message CHM. Alternatively, the message transmission and reception time may be a period of time TB from transmission of message BHM to reception of message CRM<0xAA> by vehicle 100, or a period of time TC from transmission of message BCP to reception of message CML by vehicle 100. Still alternatively, the message transmission and reception time may be a pattern in which periods of time TA, TB, and TC are combined.

Figure 5:
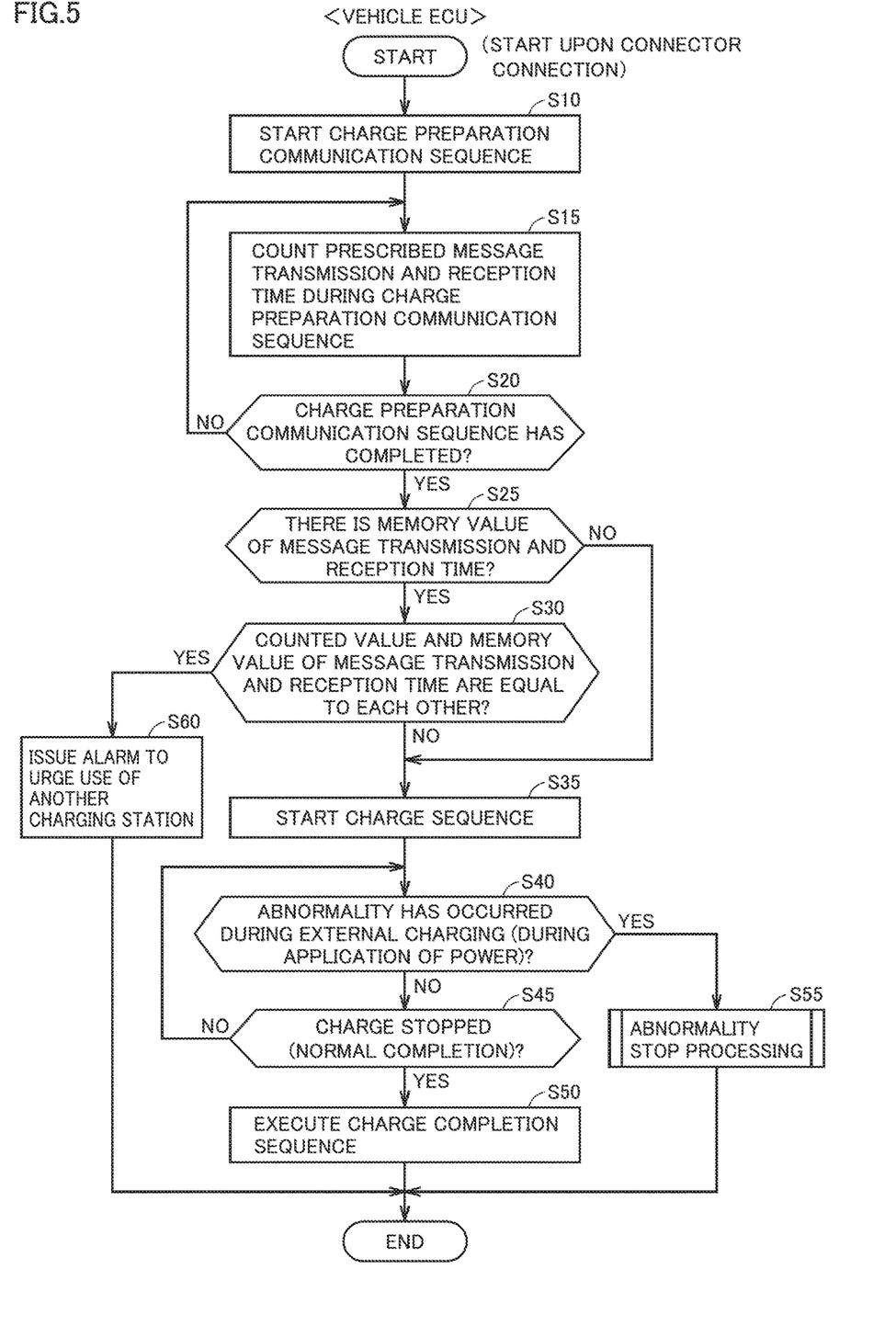
FIG. 5 is a flowchart showing an example procedure of processing performed by an ECU of a vehicle.

FIG. 5 is a flowchart showing an example procedure of processing performed by ECU 160 of vehicle 100. A series of processing shown in this flowchart starts when connector 280 is connected to inlet 150 of vehicle 100. Specifically, the series of processing starts when potential CC2 of line L6 (FIG. 3) attains to U2b in vehicle 100.

Referring to FIG. 5, ECU 160 starts the charge preparation communication sequence (step S10). The charge preparation communication sequence has been described with reference to FIG. 4. ECU 160 counts a prescribed message transmission and reception time during the charge preparation communication sequence (step S15). For example, ECU 160 counts periods of time TA, TB, and TC shown in FIG. 4 during the charge preparation communication sequence.

ECU 160 then determines whether the charge preparation communication sequence has completed (step S20). For example, ECU 160 determines that the charge preparation communication sequence has completed when receiving message CML from charging station 200 or when transmitting message BRO<0x00> to charging station 200 (FIG. 4).

When determining at step S20 that the charge preparation communication sequence has completed (YES at step S20), ECU 160 determines whether a memory value of the message transmission and reception time has been stored in the ROM of memory 164 (step S25). When the memory value of the message transmission and reception time is not in the ROM of memory 164 (NO at step S25), ECU 160 starts the charge sequence (step S35). The charge sequence has been described with reference to FIG. 4.

When determining at step S25 that the memory value of the message transmission and reception time is in the ROM of memory 164 (YES at step S25), ECU 160 determines whether the message transmission and reception time (counted value) counted at step S15 and the message transmission and reception time (memory value) stored in the ROM of memory 164 are equal to each other (step S30).

Figure 6:
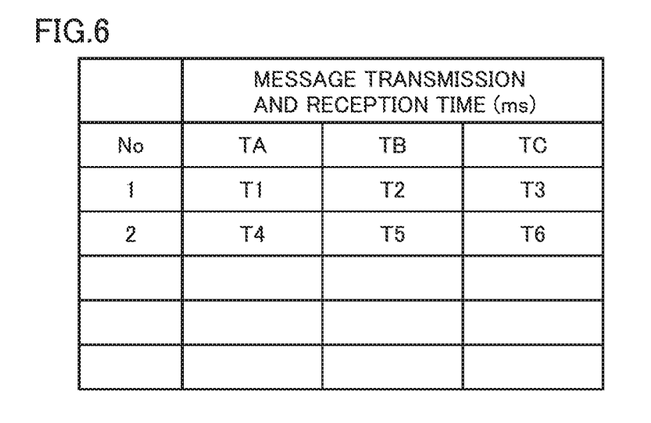
FIG. 6 shows an example message transmission and reception time stored in a memory.

FIG. 6 shows an example of the message transmission and reception time stored in memory 164. Referring to FIG. 6, two patterns of message transmission and reception times are stored in this example. The message transmission and reception time includes periods of time TA, TB, and TC shown in FIG. 4, and the charging station of a pattern equal to the pattern of the message transmission and reception times (the pattern of periods of time TA, TB, and TC) stored in memory 164 is determined to be the manufacture of a specific charging station.

The counted value and the memory value of the message transmission and reception time being equal to each other permits some discrepancy therebetween. To what extent of discrepancy is permitted can be determined appropriately in accordance with the message transmission and reception time of each manufacturer.

Referring to FIG. 5 again, when determining at step S30 that the counted value and the memory value of the message transmission and reception time differ from each other (NO at step S30), ECU 160 proceeds to step S35, so that the charge sequence is started.

Contrastingly, when determining at step S30 that the counted value and the memory value of the message transmission and reception time are equal to each other (YES at step S30), ECU 160 controls HMI device 170 to issue an alarm to urge the use of another charging station without starting the charge sequence, that is, without performing external charging (step S60). When the counted value and the memory value of the message transmission and reception time are equal to each other, ECU 160 determines that charging station 200 is a charging station from the manufacturer of a specific charging station, and does not perform the charge sequence and urges the user to use another charging station. The alarm is issued, for example, by display on HMI device 170 (FIG. 2) or by voice output.

Contrastingly, when determining at step S30 that the counted value and the memory value of the message transmission and reception time differ from each other and when the charge sequence is started at step S35, ECU 160 determines whether any abnormality has occurred during external charging (during application of power) (step S40). For example, when an overcurrent, overvoltage, overcharge, overheat, or the like has occurred, ECU 160 determines that an abnormality has occurred.

When determining at step S40 that an abnormality has occurred (YES at step S40), ECU 160 performs abnormality stop processing (step S55). Details of the abnormality stop processing will be described below in detail.

When determining at step S40 that an abnormality has not occurred (NO at step S40), ECU 160 determines whether charging has stopped (step S45). Stop of charging herein is made through normal completion, for example, is made when power storage device 110 reaches its full charge capacity, a charge complete time by timer charge is reached, or charging is intentionally stopped by a user.

When charge has not stopped (NO at step S45), ECU 160 returns the processing to step S40. When determining at step S45 that charging has stopped (YES at step S45), ECU 160 executes the charge completion sequence (step S50). The charge completion sequence has been described with reference to FIG. 4.

Figure 7:
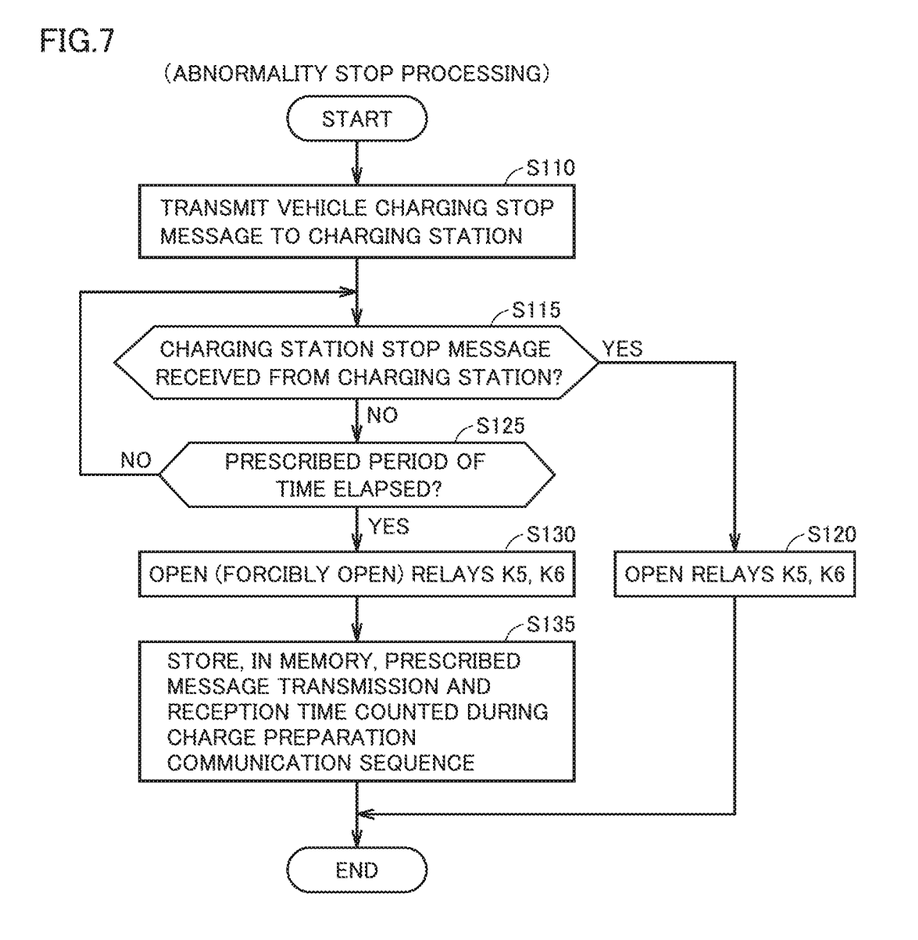
FIG. 7 is a flowchart showing an example procedure of abnormality stop processing performed at step S55 shown in FIG. 5.

FIG. 7 is a flowchart showing an example procedure of the abnormality stop processing performed at step S55 shown in FIG. 5. Referring to FIG. 7, ECU 160 transmits, to charging station 200, a vehicle charging stop message indicating that external charging is to be stopped in vehicle 100 (step S10). The vehicle charging stop message is a message for requesting charging station 200 to stop power transmission to vehicle 100 due to an abnormality that has occurred in vehicle 100.

ECU 160 then determines whether a charging station stop message indicating that charging station 200 is to be stopped has been received from charging station 200 (step S115). The charging station stop message is a message indicating that the power transmission from charging station 200 to vehicle 100 has been stopped.

Upon receipt of the charging station stop message from charging station 200 (YES at step S115), ECU 160 opens relays K5 and K6 of charge relay RY (step S120). Relays K5 and K6 are opened at step S120 upon receipt of the charging station stop message from charging station 200, that is, after the power transmission to vehicle 100 in charging station 200. Such opening is a normal operation performed during application of no power.

When determining at step S115 that it has not received the charging station stop message from charging station 200 (NO at step S115), ECU 160 determines whether a prescribed period of time has elapsed from the transmission of the vehicle charging stop message to charging station 200 at step S110 (step S125). The prescribed period of time is a period of time for counting a timeout of a response from charging station 200 to the vehicle charging stop message (reception of the charging station stop message), which is set to, for example, several hundreds of milliseconds. If the prescribed period of time has not elapsed (NO at step S125), ECU 160 returns the processing to step S115.

When determining at step S125 that the prescribed period of time has elapsed (YES at step S125), ECU 160 forcibly opens relays K5 and K6 of charge relay RY even when the power transmission from charging station 200 has not been stopped (step S130). ECU 160 then causes the ROM (readable/writable) of memory 164 to store a prescribed message transmission and reception time counted during the charge preparation communication sequence at step S15 of FIG. 5 (step S135). The message transmission and reception time stored in memory 164 herein is used at steps S25 and S30 shown in FIG. 5 during the next external charging and thereafter.

As described above, in the present embodiment, when it cannot be acknowledged that the power transmission from charging station 200 has been stopped though a request to stop power transmission is made to charging station 200 during external charging, that is, when the power transmission from charging station 200 is continued though an abnormality has occurred during external charging, the message transmission and reception time of the specific charging station 200 is stored in memory 164. Consequently, the manufacturer of the specific charging station can be specified based on an actual charging station to avoid external charging by the charging station of the relevant manufacturer.

As described above, in the present embodiment, the message transmission and reception times (e.g., periods of time TA, TB, TC in FIG. 4) are counted during the charge preparation communication sequence, and when the power transmission from charging station 200 is continued though an abnormality has occurred during external charging, the counted message transmission and reception time is stored in memory 164. In the following external charging and thereafter, when the message transmission and reception time counted during the charge preparation communication sequence is equal to the message transmission and reception time stored in memory 164, this external charging is not performed. This can prevent a situation in which a specific charging station 200 repeatedly performs external charging and charge relays RY (relays K5 and K6) are repeatedly forcibly opened, thus reducing a risk failure (fusing) of charge relay RY.

In the present embodiment, when the message transmission and reception time counted during the charge preparation communication sequence is equal to the message transmission and reception time stored in memory 164, an alarm to urge the use of another charging station is issued. This allows the user to recognize that the connected charging station 200 cannot perform external charging and move vehicle 100 to another charging station for external charging.

In the present embodiment, a prescribed message transmission and reception time is counted during the charge preparation communication sequence, and when the power transmission from charging station 200 is continued though an abnormality has occurred during external charging, the counted message transmission and reception time is stored in memory 164. In place of such a configuration, when a message transmission and reception time is known in advance that is unique to the manufacture of a specific charging station that continues power transmission though an abnormality has occurred during external charging, the message transmission and reception time may be stored in memory 164 in advance. Consequently, the manufacturer of the specific charging station can be specified in advance to avoid external charging by the charging station of the relevant manufacturer.

Although charging station 200 is a DC charging station in the present embodiment, the type of charging station 200 is not necessarily limited to a DC charging station. A vehicle capable of external charging by an AC charging station is equipped with a power converter capable of AC/DC conversion. When such a power converter does not have a power shut-off function (e.g., when the power converter includes a rectifier alone), the charge relay may be forcibly opened to stop charging in response to the power transmission continued from the charging station. Also in such a case, the charge controller of the present disclosure is useful.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charge controller for a vehicle that performs external charging of charging a power storage device mounted on the vehicle by a charging facility provided outside the vehicle, the vehicle including
a power receiving inlet that receives power from the charging facility, and
a relay provided on an electric path between the power receiving inlet and the power storage device,
the charge controller comprising a control device that forcibly opens the relay when power transmission from the charging facility is continued even though an abnormality has occurred during the external charging, wherein
the control device
executes a prescribed charge preparation communication sequence while communicating with the charging facility after the charging facility is connected to the power receiving inlet and before the external charging is performed, and
counts a response time of the charging facility to a prescribed event during the charge preparation communication sequence,
the charge controller further comprising a storage device that stores the response time of a charging facility that continues power transmission even though an abnormality has occurred during the external charging,
the control device does not perform the external charging when the response time counted during the charge preparation communication sequence is equivalent to the response time stored in the storage device.

2. The charge controller according to claim 1, wherein when power transmission from the charging facility is continued even though an abnormality has occurred during the external charging, the control device forcibly opens the relay and controls the storage device to store the response time counted during the charge preparation communication sequence of the external charging.

3. The charge controller according to claim 1, wherein when a stop of power transmission from the charging facility is not acknowledged even though the control device has requested the charging facility to stop power transmission during the external charging, the control device forcibly opens the relay and controls the storage device to store the response time counted during the charge preparation communication sequence of the external charging.

4. The charge controller according to claim 1, wherein the response time stored in the storage device is a response time set in advance.

5. The charge controller according to claim 1, further comprising a notification device that issues an alarm to urge use of another charging facility when the counted response time is equivalent to the response time stored in the storage device.

6. A vehicle comprising the charge controller according to claim 1.

* * * * *